United States Patent
Annamalai (10) Patent No.: US 8,311,557 B2
(45) Date of Patent: Nov. 13, 2012

(54) FACILITY FOR SELECTING A MOBILE DEVICE LOCATION DETERMINATION TECHNIQUE

(75) Inventor: Magesh Annamalai, Renton, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 479 days.

(21) Appl. No.: 12/467,201

(22) Filed: May 15, 2009

(65) Prior Publication Data

US 2010/0291947 A1 Nov. 18, 2010

(51) Int. Cl.
*H04W 24/00* (2009.01)
(52) U.S. Cl. ............... 455/456.1; 455/456.2; 455/456.3; 455/456.5; 455/456.6; 455/404.2
(58) Field of Classification Search ............... 455/435.3, 455/436–444, 456.1–457, 404.2
See application file for complete search history.

(56) References Cited

U.S. PATENT DOCUMENTS

| | | | |
|---|---|---|---|
| 5,724,660 A | 3/1998 | Kauser et al. | |
| 6,002,679 A | 12/1999 | Liu et al. | |
| 6,104,712 A | 8/2000 | Robert et al. | |
| 6,119,012 A | 9/2000 | Amirijoo | |
| 6,222,483 B1 | 4/2001 | Twitchell et al. | |
| 6,249,252 B1 * | 6/2001 | Dupray | 342/450 |
| 6,463,288 B1 * | 10/2002 | Havinis et al. | 455/456.1 |
| 6,603,976 B1 * | 8/2003 | Amirijoo et al. | 455/456.1 |
| 6,665,611 B1 | 12/2003 | Oran et al. | |
| 6,671,514 B1 * | 12/2003 | Cedervall et al. | 455/456.1 |
| 6,690,659 B1 | 2/2004 | Ahmed et al. | |
| 6,801,778 B2 | 10/2004 | Koorapaty et al. | |
| 7,151,941 B2 | 12/2006 | Vanttinen et al. | |
| 7,177,399 B2 | 2/2007 | Dawson et al. | |
| 7,194,354 B1 | 3/2007 | Oran et al. | |
| 7,245,900 B1 | 7/2007 | Lamb et al. | |
| 7,272,500 B1 | 9/2007 | Walker | |
| 7,283,822 B2 | 10/2007 | Gallagher et al. | |
| 7,313,143 B1 * | 12/2007 | Bruno | 370/395.4 |
| 7,353,034 B2 | 4/2008 | Haney | |
| 7,369,859 B2 | 5/2008 | Gallagher | |
| 7,436,789 B2 | 10/2008 | Caliskan et al. | |
| 7,768,963 B2 * | 8/2010 | Alizadeh-Shabdiz | 370/328 |
| 7,904,096 B2 | 3/2011 | Shyr et al. | |
| 2002/0064141 A1 | 5/2002 | Sakakura | |

(Continued)

FOREIGN PATENT DOCUMENTS

EP 2051556 A1 4/2009
(Continued)

OTHER PUBLICATIONS

U.S. Appl. No. 12/446,451, filed Apr. 20, 2009, Caldwell.
(Continued)

*Primary Examiner* — Lester Kincaid
*Assistant Examiner* — Mehmood B Khan (57) ABSTRACT

A facility for selecting a location determination technique from multiple available location determination techniques in order to determine the location of a mobile device in a cost or resource efficient manner. In order to select the location determination technique, the facility may consider various criteria such as the cost of employing the techniques, quality of service (QoS) criteria, the capabilities and/or resources of given mobile devices and/or networks, and/or the like. To select the location determination technique, the facility may rank the multiple location determination techniques according to weighted criteria and select the location determination technique according to the ranking. The criteria may be weighted according to the relative importance of each criterion to a requesting location-based service.

31 Claims, 5 Drawing Sheets

U.S. PATENT DOCUMENTS

| | | | |
|---|---|---|---|
| 2002/0123354 A1* | 9/2002 | Nowak | 455/456 |
| 2003/0016648 A1 | 1/2003 | Lindsay et al. | |
| 2003/0095069 A1* | 5/2003 | Stilp | 342/465 |
| 2003/0139182 A1 | 7/2003 | Bakkeby et al. | |
| 2003/0216143 A1 | 11/2003 | Roese et al. | |
| 2004/0087315 A1 | 5/2004 | Dufva et al. | |
| 2004/0102196 A1 | 5/2004 | Weckstrom et al. | |
| 2004/0157590 A1 | 8/2004 | Lazaridis et al. | |
| 2004/0166856 A1 | 8/2004 | Niemenmaa | |
| 2004/0202120 A1 | 10/2004 | Hanson | |
| 2004/0203853 A1 | 10/2004 | Sheynblat | |
| 2004/0224702 A1 | 11/2004 | Chaskar | |
| 2005/0003831 A1 | 1/2005 | Anderson | |
| 2005/0059415 A1 | 3/2005 | Easo et al. | |
| 2005/0066044 A1 | 3/2005 | Chaskar et al. | |
| 2005/0070306 A1 | 3/2005 | Kim et al. | |
| 2005/0130673 A1 | 6/2005 | Annamalai | |
| 2005/0136943 A1* | 6/2005 | Banerjee et al. | 455/456.1 |
| 2005/0138144 A1 | 6/2005 | Sethi | |
| 2005/0148342 A1 | 7/2005 | Sylvain | |
| 2005/0192024 A1 | 9/2005 | Sheynblat | |
| 2005/0286466 A1 | 12/2005 | Tagg et al. | |
| 2006/0009235 A1 | 1/2006 | Sheynblat et al. | |
| 2006/0014517 A1* | 1/2006 | Barclay et al. | 455/404.2 |
| 2006/0014548 A1 | 1/2006 | Bolin et al. | |
| 2006/0015513 A1 | 1/2006 | Poyhonen et al. | |
| 2006/0025158 A1 | 2/2006 | Leblanc et al. | |
| 2006/0172732 A1 | 8/2006 | Nylander et al. | |
| 2006/0194594 A1 | 8/2006 | Ruutu et al. | |
| 2006/0258365 A1 | 11/2006 | Cha et al. | |
| 2007/0123237 A1 | 5/2007 | Cacioppo et al. | |
| 2007/0155489 A1* | 7/2007 | Beckley et al. | 463/29 |
| 2007/0189497 A1* | 8/2007 | Bareis | 379/350 |
| 2008/0045236 A1 | 2/2008 | Nahon et al. | |
| 2008/0081620 A1 | 4/2008 | Lu et al. | |
| 2008/0108319 A1 | 5/2008 | Gallagher | |
| 2008/0192696 A1 | 8/2008 | Sachs et al. | |
| 2008/0280624 A1 | 11/2008 | Wrappe | |
| 2009/0177730 A1 | 7/2009 | Annamalai et al. | |
| 2009/0185669 A1 | 7/2009 | Zitnik et al. | |
| 2009/0275348 A1 | 11/2009 | Weinreich et al. | |
| 2010/0046406 A1 | 2/2010 | Annamalai et al. | |
| 2010/0069099 A1 | 3/2010 | Dunn et al. | |
| 2010/0289640 A1 | 11/2010 | Annamalai | |
| 2010/0331017 A1* | 12/2010 | Ariga | 455/456.3 |
| 2011/0039576 A1 | 2/2011 | Prakash et al. | |
| 2011/0047033 A1 | 2/2011 | Mahaffey et al. | |
| 2011/0051658 A1 | 3/2011 | Jin et al. | |
| 2011/0051665 A1 | 3/2011 | Huang | |
| 2011/0200022 A1 | 8/2011 | Annamalai | |

FOREIGN PATENT DOCUMENTS

| | | |
|---|---|---|
| JP | 10239416 | 9/1998 |

OTHER PUBLICATIONS

U.S. Appl. No. 12/446,453, filed Apr. 20, 2009, Jin et al.
U.S. Appl. No. 12/446,454, filed Apr. 20, 2009, Annamalai.
"Enabler Release Definition for Secure UserPlane for Location," Candidate Version 1.0, Open Mobile Alliance, Jan. 22, 2007, 17 pages.
"Google Search of Location of Mobile," http://www.google.com/search?q=location+of+mibile&sourceid=ie7&rls=com.microsoft:en-us:IE-SearchBox&ie=&oe= [Last Accessed Jun. 8, 2010], 2 pages.
"IP Multimedia Subsystem," Wikipedia, http://wikipedia.org/wiki/IP_Multimedia_Subsystem, 13 pages [Last Accessed May 5, 2010].
"Secure User Plane for Location Requirements," Candidate Version 1.0, Open Mobile Alliance, Jun. 16, 2005, 26 pages.
"Secure UserPlane for Location Architecture," Candidate Version 1.0, Open Mobile Alliance, Jan. 22, 2007, 80 pages.
"The 3GPP Standard for Convergence-Diagram," UMA Universal Mobile Access, http://www.umatoday.com/img/diagrams/umaServices.jpg, [First Accessed Oct. 17, 2007], 1 page.
"The 3GPP Standard for Convergence-Dual Mode Handsets," UMA Universal Mobile Access, UMA Today, 2007, 2 pages.
"The 3GPP Standard for Convergence-Femtocells," UMA Universal Mobile Access, UMA Today, 2007, 2 pages.
"The 3GPP Standard for Convergence-Softmobiles," UMA Universal Mobile Access, UMA Today, 2007, 2 pages.
"The 3GPP Standard for Convergence-Terminal Adaptors," UMA Universal Mobile Access, UMA Today, 2007, 2 pages.
"UserPlane for Location Protocol," Candidate Version 1.0, Open Mobile Alliance, Jan. 22, 2007, 56 pages.
Annamalai, Magesh, "Method and Delivery of UMA Value Added Location Services Via SUPL," U.S. Appl. No. 60/853,086, filed Oct. 20, 2006, 15 pages.
Dyoub, J. et al., "Dueling Architectures: Control plane vs. Userplane," HP invent, 2004, 2 pages.
Gum, Arnold et al., "Infrastructure Wireless Choices for LBS," GPS World, Mar. 2, 2006, http://www.gpsworld.com/wireless/infrastructure/wireless-choices-lbs-3750?print=1, [Last Accessed Apr. 28, 2010], 5 pages.
International Search Report and Written Opinion, International Application No. PCT/US2007/82133, Applicant: T-Mobile USA, Inc., Flied on Oct. 22, 2007, Date Mailed on Apr. 29, 2008, 9 pages.
International Search Report and Written Opinion, International Application No. PCT/US2006/41226, Filed on Oct. 20, 2006, Applicant: T-Mobile USA, Inc., Date of Mailing: Dec. 4, 2007, 18 pages.
International Search Report and Written Opinion, International Application No. PCT/2007/82156, Filed on Oct. 22, 2007, Applicant: T-Mobile USA, Inc., Date of Mailing: May 28, 2008, 12 pages.
International Search Report and Written Opinion, International Application No. PCT/US2007/66579, Filed on Apr. 12, 2007, Applicant: T-Mobile, Inc., Date of Mailing Sep. 9, 2008, 9 pages.
International Search Report and Written Opinion, International Application No. PCT/US2007/82136, Applicant: T-Mobile USA, Inc., Flied on Oct. 22, 2007, Date Mailed on Mar. 11, 2008, 11 pages.
Raja, K., et al., "We Know," IEE Communication Engineer, Jun./Jul. 2004, 6 pages.
Spinney, Jonathan, "Wireless Location Uses in the User Plane and Control Plane," The Location Based Services Community, Jun. 27, 2005, 3 pages.
U.S. Appl. No. 13/154,365, filed Jun. 6, 2011, Caldwell et al.
International Search Report and Written Opinion, International Application No. PCT/US2010/035010, Applicant: T-Mobile USA, Inc., Flied on May 14, 2010, Date Mailed on Dec. 22, 2010, 10 pages.
International Search Search Report and Written Opinion, International Application No. PCT/US2010/035014, Applicant: T-Mobile USA, Inc., Flied on May 14, 2010, Date Mailed on Dec. 28, 2010, 11 pages.
Martin-Escalona, et al., "Delivery of Non-Standardized Assistance Data in E-OTD/GNSS Hybrid Location Systems," IEEE 2002, pp. 1-5.
Steinfield, "The Development of Location Based Services in Mobile Commerce," Elife after the dot.com bust, Berlin, Springer, 2004, pp. 1-15.
U.S. Appl. No. 12/089,905, filed Feb. 9, 2009, System and Method for Determining Device Location in an IP-Based Wireless Telecommunications Network.
U.S. Appl. No. 12/549,290, filed Aug. 27, 2009, Mobile Computing Device Geographic Location Determination.
U.S. Appl. No. 13/154,365, filed Jun. 6, 2011, System and Method for Determining a Subscriber's Zone Information.
U.S. Appl. No. 12/446,453, filed Apr. 20, 2009, Two Stage Mobile Device Geographic Location Determination.
U.S. Appl. No. 12/446,454, filed Apr. 20, 2009, System and Method for Utilizing IP-Based Wireless Telecommunications Client Location Data.
U.S. Appl. No. 12/467,215, filed May 15, 2009, Mobile Device Location Determination Using Micronetworks.

* cited by examiner

FACILITY FOR SELECTING A MOBILE DEVICE LOCATION DETERMINATION TECHNIQUE

BACKGROUND

The popularity of location-based services has substantially increased in recent years. For example, mobile device users now employ location-based services for navigation, to perform location-based searching, to receive location-based alerts or advertising, to search for or receive notification of nearby acquaintances, and/or the like. Likewise, other parties (e.g., network operators, third party location-based service providers, remote telemetry users, advertisers, etc.) may employ location-based services to enable E911 services, enable asset tracking or recovery services, provide location-based alerts or advertising, provide notification of nearby acquaintances, and/or the like.

The recent increase in the popularity of location-based services has led to the development of many different techniques to locate mobile devices. Each location determination technique may have specific financial costs, resource, quality of service (QoS), and other criteria associated therewith. Although a mobile device, communications network, or application may be able to employ multiple location determination techniques, certain location determination techniques may be more suitable for certain situations.

DETAILED DESCRIPTION

A software and/or hardware facility to select a location determination technique from multiple location determination techniques for purposes of determining the location of a mobile device is disclosed. The location determination technique is selected according to criteria such as the cost of employing the techniques, a desired quality of service (QoS), the capabilities and/or resources of given mobile devices and/or networks, and/or the like. The criteria may be weighted according to the relative importance of each criterion to a requesting location-based service. The selected location determination technique is then employed to determine and/or estimate the location of the mobile device.

Suitable location determination techniques include Time Difference on Arrival (TDOA) (including Uplink-TDOA (U-TDOA), Observed TDOA (OTDOA), Ideal Period Downlink-OTDOA (IPDL-OTDOA), and other TDOA procedures), use of a Global Positioning System (GPS), use of an Assisted Global Positioning System (AGPS), Emergency Intersystem Handoff (EISHO), Round Trip Time (RTT) measurements, Enhanced Observed Time Difference (E-OTD), triangulation, and/or the like. These location determination techniques may determine or estimate the location of a mobile device according to an identifier of a cell, femtocell, picocell, access point, base station, Node-B, eNode-B, cell site, and/or other network component or network that is accessible to the mobile device. Suitable identifiers include an Internet Protocol (IP) address, a Cell Global Identity (CGI), an Enhanced Cell Global Identity (E-CGI), a Media Access Control (MAC) address, a Service Set Identifier (SSID), an International Mobile Subscriber Identity (IMSI), an International Mobile Equipment Identity (IMEI), a serial number, and/or the like. Suitable examples of determining or estimating the location of a mobile device according to an identifier are described in International Patent Application PCT/US2007/066579, entitled "Mobile Computing Device Geographical Location Determination," which was filed on Apr. 12, 2007; International Patent Application PCT/US2006/041226, entitled "System and Method for Determining Device Location in an IP-Based Wireless Telecommunications Network," which was filed on Oct. 20, 2006; International Patent Application PCT/US2007/082136, entitled "System and Method for Utilizing IP-Based Wireless Telecommunications Client Location Data," which was filed on Oct. 22, 2006; and International Patent Application PCT/US2007/082133, entitled "Two Stage Mobile Device Geographical Location Determination," which was filed on Oct. 22, 2006; all of which are hereby incorporated by reference in their entirety.

The facility may be employed to facilitate the provision of location-based services to mobile device users, emergency services users, remote telemetry users, and others. The facility also enables service providers to provide location-based services in a cost-effective manner by tailoring the location-based services according to the needs of each particular application, situation, user, etc. For example, a service provider may employ the facility to provide fast and accurate location-based services to a relatively cost-insensitive user or application (e.g., emergency service users, tracking high value assets, etc.) while also providing more economical but less accurate or slower location-based services to a cost-sensitive user or application (e.g., routine navigation, location-based searching, location-based advertising, etc.).

The following description provides specific details for a thorough understanding of, and enabling description for, various examples of the technology. One skilled in the art will understand that the technology may be practiced without many of these details. In some instances, well-known structures and functions have not been shown or described in detail to avoid unnecessarily obscuring the description of the examples of the technology. It is intended that the terminology used in the description presented below be interpreted in its broadest reasonable manner, even though it is being used in conjunction with a detailed description of certain examples of the technology. Although certain terms may be emphasized below, any terminology intended to be interpreted in any restricted manner will be overtly and specifically defined as such in this Detailed Description section.

Illustrative Environments

Figure 1:
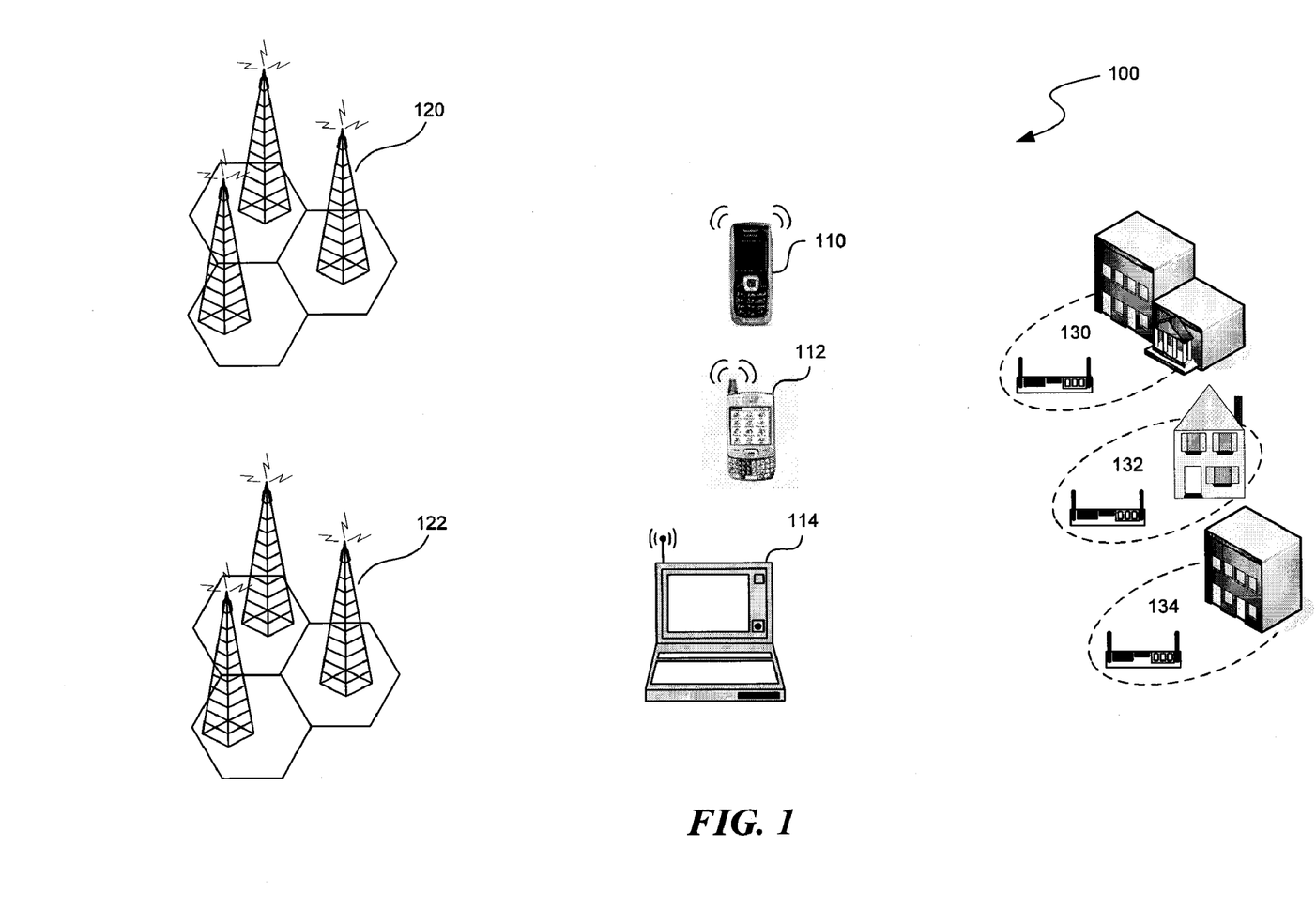
FIG. 1 is a diagram of a suitable environment for practicing aspects of the invention.

FIG. 1 illustrates an environment 100 in which the facility may be practiced. Environment 100 includes mobile devices 110, 112, and 114 and wireless networks 120, 122, 130, 132, and 134. Mobile devices 110, 112, and 114 are configured to wirelessly communicate with, or through, one or more of networks 120, 122, 130, 132, and 134.

Mobile devices 110, 112, and 114 may include virtually any devices for communicating over a wireless network. Such devices include cellular telephones, Global System for Mobile Communications (GSM) telephones, Time Division Multiple Access (TDMA) telephones, Universal Mobile Telecommunications System (UMTS) telephones, Evolution-Data Optimized (EVDO) telephones, Long Term Evolution (LTE) telephones, Secure User Plane Location (SUPL) Enabled Terminals (SETs), Generic Access Network (GAN) telephones, Unlicensed Mobile Access (UMA) telephones, Voice over Internet Protocol (VoIP) devices, other mobile telephones, Personal Digital Assistants (PDAs), radio frequency (RF) devices, infrared (IR) devices, handheld computers, laptop computers, wearable computers, tablet computers, pagers, integrated devices combining one or more of the preceding devices, and/or the like. As such, mobile devices 110, 112, and 114 may range widely in terms of capabilities and features. For example, a mobile telephone may have a numeric keypad and the capability to display only a few lines of text. However, other mobile devices (e.g., smart phones) may have a touch-sensitive screen, a stylus, and a relatively high-resolution display.

Users may employ mobile devices 110, 112, and 114 to communicate with other users or devices. In addition, users may employ mobile devices 110, 112, and 114 to receive, provide, or otherwise interact with location-based services such as E911 services, asset tracking or recovery services, location-based alerts or advertising services, social networking services such as identification of nearby friends and family, and/or the like. Location-based services may be initiated via network devices or via the mobile device.

Mobile devices 110, 112, and 114 typically include a processing unit, volatile memory and/or nonvolatile memory, a power supply, one or more network interfaces, an audio interface, a display, a keypad or keyboard, a GPS receiver and/or other location determination component, and other input and/or output interfaces (not shown). The various components of mobile devices 110, 112, and 114 may be interconnected via a bus. The volatile and nonvolatile memories generally include storage media for storing information such as processor-readable instructions, data structures, program modules, or other data. Some examples of information that may be stored include basic input/output systems (BIOS), operating systems, and applications. In addition, the memories may be employed to store operational data, content, contexts, and/or the like. The memories may also store one or more applications configured to receive and/or provide messages from and/or to another device or component. These messages may also be displayed and/or stored on mobile device 110, 112, or 114. Such messages may include short message service (SMS) messages, multi-media message service (MMS) messages, instant messaging (IM) messages, enhanced message service (EMS) messages, and/or any other content directed towards a user of mobile device 110, 112, or 114. Likewise, the memories may also store one or more applications configured to receive and/or provide information to location-based services or to facilitate performance of location determination techniques. These memories may also store applications for performing location determination techniques.

Networks 120, 122, 130, 132, and 134 may include virtually any networks for facilitating communications to or from mobile devices 110, 112, and 114 using any wireless protocol or standard. These protocols or standards include GSM, TDMA, UMTS, EVDO, LTE, GAN, UMA, Code Division Multiple Access (CDMA), Orthogonal Frequency Division Multiple Access (OFDM), General Packet Radio Service (GPRS), Enhanced Data GSM Environment (EDGE), Advanced Mobile Phone System (AMPS), Worldwide Interoperability for Microwave Access (WiMAX), Wireless Fidelity (WiFi), Ultra Mobile Broadband (UMB), VoIP, SUPL, IP Multimedia Subsystem (IMS), and/or the like. Networks 120, 122, 130, 132, and 134 may be operated by a mobile telephony service provider, an Internet service provider, businesses, individuals, or other network operators.

In FIG. 1, networks 120 and 122 are illustrated as macronetworks, e.g., networks typically designed to cover relatively large areas such as cities, metropolitan areas, regional areas, multi-state areas, and/or the like. Protocols and standards such as GSM, TDMA, UMTS, EVDO, LTE, CDMA, OFDM, GPRS, EDGE, AMPS, WiMAX, UMB, and/or the like are generally employed with macronetworks. Further, networks 130, 132, and 134 are illustrated as micronetworks, e.g., networks typically designed to cover smaller areas such as neighborhoods, parks, cities, buildings, homes, and/or the like. To provide an example, protocols and standards such as WiFi, GAN, UMA, Wireless Universal Serial Bus (WUSB), ZigBee, and/or the like are generally employed with micronetworks. However, in certain circumstances (e.g., in conjunction with picocell broadcast architecture or the like), micronetworks may also employ protocols or standards more traditionally associated with macronetworks.

At any given location, one or more of networks 120, 122, 130, 132, and 134 may provide overlapping coverage areas. For example, at a particular geographical location, a mobile device may be within range of a UMA network, a GSM network, a UMTS network, and an EVDO network. At another geographical location, the mobile device may be within range of the same or a different set of networks.

At times, a user of a mobile device or a party providing services to a mobile device may want to determine the location of the mobile device. Although many location determination techniques will typically be available to locate the mobile device, certain location determination techniques may be better suited for given situations. Described herein is a facility for selecting location determination techniques optimized to given situations. The facility allows the mobile device and/or a network component associated with the mobile device to select an available location determination technique to determine the location of the mobile device. After selecting a location determination technique, the mobile device may optionally associate and interact with a network associated with the location determination technique in order to complete the location determination and provide the determined location to the requesting location-based service.

Illustrative Communications System

Figure 2:
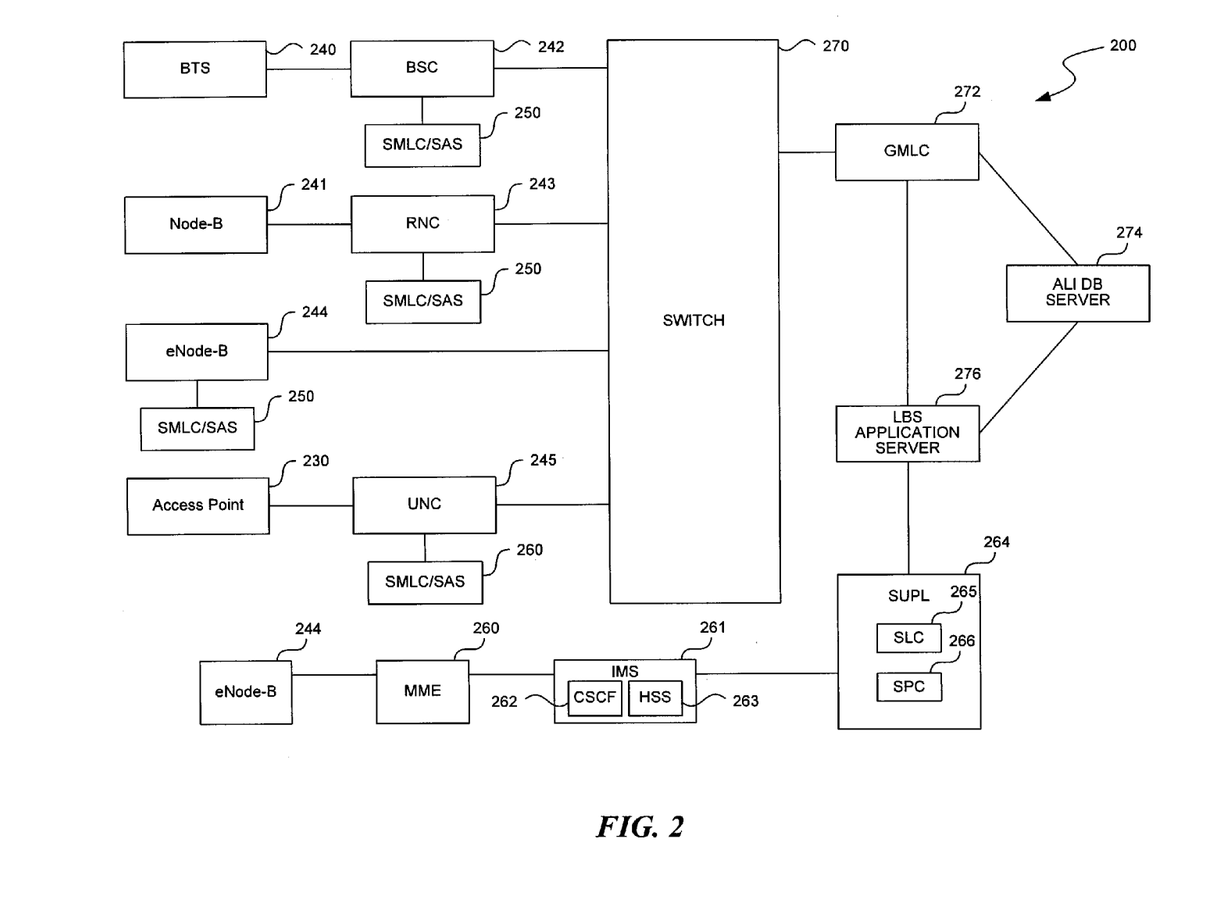
FIG. 2 is a block diagram of a suitable communications system for practicing aspects of the invention.

FIG. 2 illustrates a communications system 200, in which the facility may operate. Communications system 200 includes a base station (BTS) 240, a Node-B 241, a Base Station Controller (BSC) 242, a Radio Network Controller (RNC) 243, eNode-Bs 244, an access point 230, an Unlicensed Network Controller (UNC) 245, Serving Mobile Location Centers (SMLC)/Standalone Assisted GPS SMLCs (SAS) 250, a Mobility Management Entity (MME) 260, an IP Multimedia Subsystem (IMS) 261, a Secure User Plane Location (SUPL) system 264, a switch 270, a Gateway Mobile Location Center (GMLC) 272, an Automatic Location Identification Database (ALI DB) server 274, and a Location-Based Service (LBS) application server 276. While communications system 200 is illustrated and described in terms of GSM/GPRS/UMTS/LTE/UMA network components and architecture, the facility is not limited to such technologies. Any suitable communications system may employ all or part of the facility described herein.

In an example of a GSM/GPRS/EDGE/UMTS communications system, BTS 240 and Node-B 241 are configured to provide a low-level radio interface to mobile devices under the control of BSC 242 and RNC 243. For example, BTS 240 may provide low-level GSM radio interfacing while Node-B 241 provides low-level GPRS and/or UMTS radio interfacing. In such an example, BTS 240 and Node-B 241 include limited command and control functionality or no command and control functionality. Instead, BSC 242 and/or RNC 243 provide such functionality while BTS 240 and Node-B 241 provide physical layer interfaces to associated mobile devices. BTSs and Node-Bs may be positioned at distributed locations to provide network coverage throughout a geographical area.

BSC 242 is coupled between switch 270 and BTS 240 to provide a voice interface to, and control certain operational aspects of, BTS 240. For example, BSC 242 may be configured to control handoffs, network registration for mobile devices, channel allocation, radio transmitter output power, and/or the like. BSC 242 may be employed to control any number of BTSs.

Similarly, RNC 243 is coupled between switch 270 and Node-B 241 to provide a data interface to, and control certain operational aspects of, Node-B 241. Also, RNC 243 may be employed to control any number of Node-Bs. As one example, RNC 243 is employed in a UMTS system.

One instance of eNode-B 244 is coupled to switch 270 to interface mobile devices directly to switch 270. As one example, this instance of eNode-B 244 is employed as a consolidated LTE counterpart of BTS 240, Node-B 241, BSC 242, and RNC 243. A second instance of eNode-B 244 may be employed in an IMS/SUPL communications system and be configured to provide radio access network (RAN) functionality in order to interface mobile devices to MME 260, as discussed below.

BTS 240, Node-B 241, eNode-Bs 244, or virtually any other components or devices positioned at distributed locations to provide wireless network coverage throughout a geographical area may be referred to as a cell site. In certain instances, cell sites may also include other components such as BSCs, RNCs, SMLC/SASs, switches, MMEs, and/or the like.

An access point 230 may also serve to route communications between mobile devices and other network components (e.g., UNC 245) over an IP-based network. An access point typically provides coverage for a relatively small area, such as for a femtocell within a building (e.g., home, office, shopping mall, train station, or the like) or within an aircraft, ship, train, or other vehicle. Access point 230 may take the form of a WiFi access point, a HotSpot component, a wireless router, a wireless access point, and/or the like. One or more access points may be coupled to UNC 245 or another network component.

Access point 230 is included, for example, in IP-based network implementations of communications system 200. Such IP-based network implementations may take the form of a VoIP broadcast architecture, UMA or GAN broadcast architecture, femtocell broadcast architecture, and/or the like. As used herein, VoIP is a telecommunication system for the transmission of voice over the Internet or other packet-switched networks, and UMA is a commercial name of the 3rd Generation Partnership Project (3GPP) GAN standard. Somewhat like VoIP, UMA/GAN is a telecommunication system that extends services, voice, data, and IP Multimedia Subsystem/Session Initiation Protocol (IMS/SIP) applications over IP-based networks. For example, a common application of UMA/GAN is in a dual-mode handset service in which mobile device users can roam and handoff between local area networks and wide area networks using a GSM/WiFi dual-mode mobile phone. UMA/GAN enables the convergence of mobile, fixed, and Internet telephony, which is sometimes called Fixed Mobile Convergence.

Picocell access points may also be referred to as cell sites. Picocell access points typically cover a relatively small area, such as an area within a building (e.g., home, office, shopping mall, train station, or the like), a vehicle (e.g., within an aircraft, ship, train, or the like), or other location. A picocell access point is analogous to a WiFi access point, except that the picocell access point communicates with mobile devices over the licensed spectrum of an associated wireless carrier. A picocell access point serves as an access point for routing communication between mobile devices and other network components, e.g., BSC 242 or UNC 245, over IP-based networks, dedicated connections (e.g., T1 connections, OC3 connections, etc.), frame relay connections, microwave connections, and/or the like.

UNC 245 is coupled between switch 270 and one or more access points to interface the access points to switch 270. As one example, UNC 245 may be a UMA/GAN counterpart of RNC 243. In addition, a Generic Access Network Controller (GANC) may be suitably employed as UNC 245.

As shown, each of BTS 240, Node-B 241, BSC 242, RNC 243, and an instance of eNode-B 244 are coupled to instances of Serving Mobile Location Centers (SMLC) and/or Standalone Assisted GPS SMLCs (SAS) 250. Suitable SMLCs are configured to provide and/or coordinate location determination or estimation. In addition, suitable SASs may additionally include AGPS equipment and be configured to provide AGPS location determination or estimation. As one example, SMLC/SAS 250 may also be configured to select and/or employ location determination techniques.

In addition, MME 260 is coupled between an IMS/SUPL instance of eNode-B 244 and SUPL system 264. MME 260 functions as a node in an LTE/IMS/SUPL communications system to provide core network control and/or other functionality. MME 260 may be a MME as described by the System Architecture Evolution (SAE) standards available from the $3^{rd}$ Generation Partnership Project (3GPP), such as by TS 23.401.

An IMS 261 is coupled between MME 260 and SUPL system 264 and interacts with other network components to provide IP services to a mobile device. As illustrated, IMS 261 includes Call Session Control Function (CSCF) 262 and Home Subscriber Server (HSS) 263. IMS 261, CSCF 262, and HSS 263 may respectively be an IMS, CSCF, and HSS as described by the IMS specifications of the 3GPP, 3rd Generation Partnership Project 2 (3GPP2), Telecoms and Internet Converged Services and Protocols for Advanced Networks (TISPAN), or other standards organizations.

SUPL system 264 is coupled between IMS 261 and LBS application server 276 and is configured to select, employ, and/or facilitate location determination techniques and/or location-based services. As illustrated, SUPL system 264 includes SUPL Location Center (SLC) 265 and SUPL Positioning Center (SPC) 266. Each of SUPL system 264, SLC 265, and SPC 266 may be as described by the SUPL standards available from the Open Mobile Alliance (OMA).

Switch 270 is configured to provide voice and data interfaces, as appropriate, to BSC 242, RNC 243, eNode-B 244, and UNC 245. Switch 270 may be configured to switch voice traffic from one or more base station controllers to a Public Switched Telephone Network (PTSN) or to a telephone switch such as a 5ESS switch, a PBX switch, and/or the like. Likewise, switch 270 may be further configured to switch data from one or more RNCs to a data network, to a router, to another switch, and/or the like. Also, switch 270 may include a Mobile Switching Center (MSC), a media gateway, a call gateway, and/or the like.

Switch 270 is also coupled to GMLC 272, which is coupled to ALI DB server 274 and LBS application server 276. Switch 270 and or GMLC 272 may be configured to select, employ, and/or facilitate location determination techniques and/or location-based services. LBS application server 276 may communicate with ALI DB server 274 and/or GMLC 272 to receive location determination information or to perform a location determination.

In one example, LBS application server 276 is configured as, or to provide location information to, a PSAP, e.g., as part of an E-911 service. However, LBS application server 276 may also be configured to provide location information to any other entity or for any other purpose. For example, LBS application server 276 may be configured to provide location information to mobile device users, network operators, third party location-based service providers, remote telemetry users, advertisers, and/or the like. Likewise, LBS application server 276 may instead be an LBS client such as a PSAP, LBS application, user device, and/or the like.

While FIGS. 1 and 2 illustrate specific examples of suitable environments and communications systems in which the facility may operate, various modifications such as the inclusion of additional components, consolidation and/or deletion of various components, and shifting of functionality from one component to another may be made without deviating from the invention.

Facility for Selecting a Location Determination Technique

Figure 3:
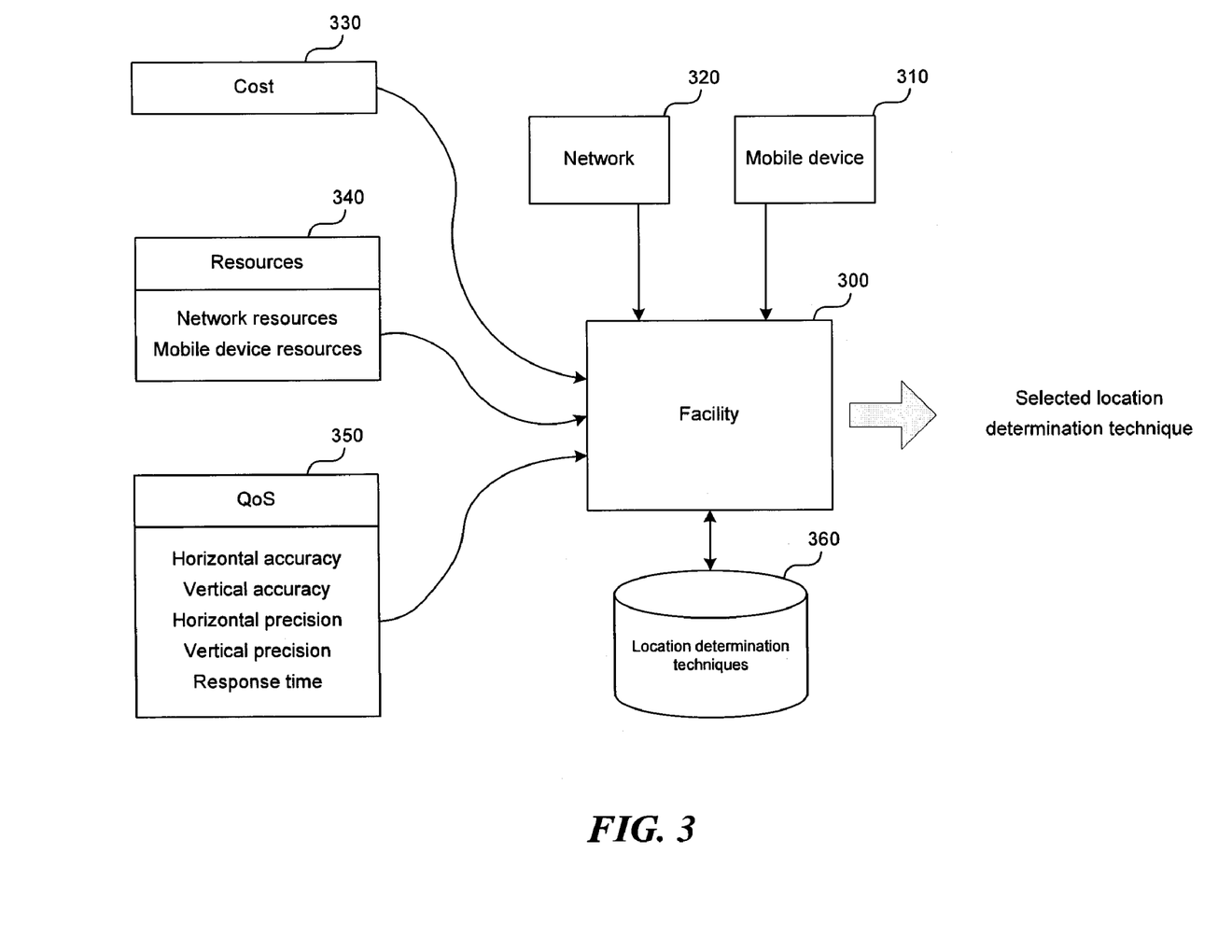
FIG. 3 is a block diagram of a facility for selecting a preferred method of locating a mobile device.

FIG. 3 illustrates a facility 300 for selecting a location determination technique. Facility 300 may be implemented as a software and/or hardware facility on any device or component. For example, facility 300 may be implemented on mobile devices 110, 112, or 114, on SMLC/SAS 250, on Node-B 241, on switch 270, on LBS application server 276, and/or the like. In one system, facility 300 is implemented in an MSC of switch 270. However, facility 300 may also be wholly or partially implemented on SUPL system 264. For example, process 300 may be wholly or partially implemented on SLC 265 and/or SPC 266. In addition, a user may employ an interface to manually select or configure a facility for location determination. Such an interface may be web-based, mobile device-based, and/or the like.

As illustrated, facility 300 is configured to detect a request for location determination of a mobile device via either a mobile device interface 310 or a network interface 320. As an example, facility 300 may receive an indication via the mobile device interface 310 that a mobile device operator or a party that provides service to the mobile device has requested a location determination of the mobile device. As another example, facility 300 may detect a location determination request by monitoring, via network interface 320, traffic to a location-based service. The detected request may also include, or be associated with, a relative importance of various criteria, such as the criteria discussed below.

When the request to determine a location of the mobile device is received, the facility 300 determines the availability of one or more location determination techniques based on the type of networks accessible to the mobile device and the type of the mobile device. For example, facility 300 may receive a list of networks that are currently accessible by the mobile device (e.g., networks identifiable by the mobile device, networks within communications range of the mobile device, networks the mobile device is authorized to access, etc.) via mobile device interface 310. Also, the facility 300 is able to determine the mobile device capabilities (e.g., processing power, firmware version, battery power, GPS capabilities, etc.) based on the type of mobile device that is associated with the location determination request. Such device capabilities may be stored in a lookup table that is maintained by the facility and which correlates a mobile device's model number, serial number, capabilities, or other information from a service provider database. Alternatively, the device capabilities may be received via the mobile device interface 310.

Once the type of accessible networks and/or type of mobile device has been determined, the facility 300 determines the location determination techniques that are available to determine or estimate the location of the mobile device. To make such a determination, the facility 300 may access a data store 360 containing a set of location determination techniques that are supported by the mobile device and the networks accessible to the mobile device. The data store 360 includes a table indicating which networks and/or mobile devices support particular location determination techniques (e.g., TDOA supported by LTE, UMTS, and CDMA networks, but not by AMPS network; E-OTD supported by GSM networks, but not CDMA or AMPS networks; location determination according to a network component identifier supported by micronetworks, but not by macronetworks, AGPS supported with mobile devices having GPS capabilities, etc.). Facility 300 may also determine available location determination techniques in other ways. For example, facility 300 may receive information regarding available location determination techniques via network interface 320.

Upon determination of available location determination techniques, facility 300 selects a particular location determination technique from the list of available location determination techniques. The facility is configured to select which location determination technique to use by evaluating each technique using several criteria, such as cost criteria 330, resources criteria 340, and QoS criteria 350:

Cost criteria 330 may include a direct financial cost, e.g., a financial cost to the user, income to the service provider, a financial cost to the service provider, a user's service plan information (e.g., whether on a pay per use or flat rate service plan, etc.), a financial cost associated with a particular location determination technique (e.g., fee for performing the technique, cost for employing a network, cost for employing a communications mode, cost for employing a connection, etc.), and/or the like.

Resource criteria 320 may include information relating to use of finite network resources (e.g., air interface bandwidth, backhaul bandwidth, processing time, database lookups, utilization of shared servers, etc.), service provider settings or preferences, resources required to implement each location determination technique, and/or the like. Resource criteria may also include information relating to use of mobile device resources (e.g., battery power, processing time, data storage, need for user input, display capabilities, etc.), resources required to implement a particular location determination technique, and/or the like.

QoS criteria 330 may be employed by facility 300 to achieve a desired balance between accuracy, precision, response time, and yield. For example, QoS criteria may be employed to select between location determination techniques associated with relatively imprecise, inaccurate, or slow location determination and other location determination techniques associated with precise, accurate, or fast location determination. As shown, QoS criteria utilized by facility 300 may include the desired accuracy (horizontal and/or vertical); the desired precision (horizontal and/or vertical); and desired response time (e.g., the amount of time it takes for an initial location determination, the amount of time it takes for a final location determination, the frequency that the location determination will be refreshed, speed of an associated network, Time To Fix (TTF), etc.). Other examples of QoS criteria that facility 300 may evaluate include a willingness of a user to pay for a relatively high QoS or to accept a relatively low QoS and/or other characteristics of the location determination techniques; a willingness of a service provider to provide location determination having a relatively low QoS; QoS requirements of a particular location determination technique; yield (e.g., an expected or actual percentage of successful location determinations, an expected or actual percentage of valid location determinations, etc); and/or the like.

In operation, some or all of these criteria are employed to select a location determination technique that is used to determine or estimate the location of a mobile device. The cost, resource, or QoS criteria is evaluated against each of the available location determination techniques. When the facility 300 utilizes the various criteria to select a location determination technique, each criterion may be weighted to increase or decrease the importance of that criterion. As one example, facility 300 may equally weight each criterion to make a selection and make a selection where each criterion is given the same weight as other criterion. An another example, the facility may assign weights to each of the criterion, rank the available location determination techniques according to the weighted criteria, and make a selection according to the weighted ranking. The weights may be assigned by the facility to the selection criterion based on the type of application requesting the location determination (e.g., according to the relative importance of each criterion to the requesting location-based service), based on an expected frequency of location determination requests (e.g., a location update rate for a navigation application), based on configuration information (e.g., a user's data plan, budget, or preferences; a service provider's preferences; etc.), and/or the like. After the criteria are applied by the facility to the available location determination techniques, the facility selects a preferred location determination technique that scores the highest based on the applied criteria.

Rather than select only a single preferred location determination technique, facility 300 may also be configured to select multiple location determination techniques to operate together as a hybrid location determination technique. For example, such hybrid techniques may employ multiple location determination techniques to provide greater accuracy or precision, to provide a relatively fast initial location determination and a slower but more accurate location determination, and/or the like.

An indication of the location determination technique selection is then provided by the facility 300 to the mobile device, network, network component, and/or the like. The indicated location determination technique is employed by the mobile device or network component to determine or estimate the location of the mobile device. The determined or estimated location is then provided to the mobile device, a user of the mobile device, a location-based service, a remote party, and/or the like.

To provide examples of the operation of facility 300, the facility may select the least expensive location determination technique from the list of available location determination techniques for a particular mobile device where cost is the most important criteria for determining which location determination technique to use. Likewise, the facility may also select relatively inexpensive location determination techniques for allowing advertisers to send bulk advertisements to mobile devices within a large area. In contrast, the facility may select the location determination technique providing the quickest and most accurate location estimates, irrespective of cost, to emergency services users dealing with life or death situations. The facility may also select a moderate cost location determination technique to navigation application users, where a trade-off between accuracy and time are important.

As each available location determination technique may only be employable over some of the networks and/or communications modes (e.g., circuit-switched, packet-switched, simultaneous circuit- and packet-switched, nonsimultaneous circuit- and packet-switched, etc.) accessible to, or employable by, the mobile device, facility 300 may also be configured to indicate a network and/or communications mode associated with the selected location determination technique. That is, the facility may also indicate which of the available networks are capable of facilitating or providing the selected location determination technique. If the mobile device is currently not associated with an indicated network, the mobile device may temporarily associate with the indicated network (while remaining associated with a previous network) in order to determine the location of the mobile device. Alternatively, the mobile device may disassociate from the network that the mobile device is currently associated to and associate with the indicated network.

The above examples, techniques, and criteria are provided to illustrate the operation of facility 300. However, the above discussion merely illustrate some of the many possible inputs and some of the many ways in which facility 300 may utilize various inputs to select a location determination technique. The illustrated inputs are provided merely to illustrate some of the many possible input sources for facility 300. In other systems, other, different, fewer, and/or additional inputs may be suitably employed.

Illustrative Logical Flow Diagrams

Figure 4:
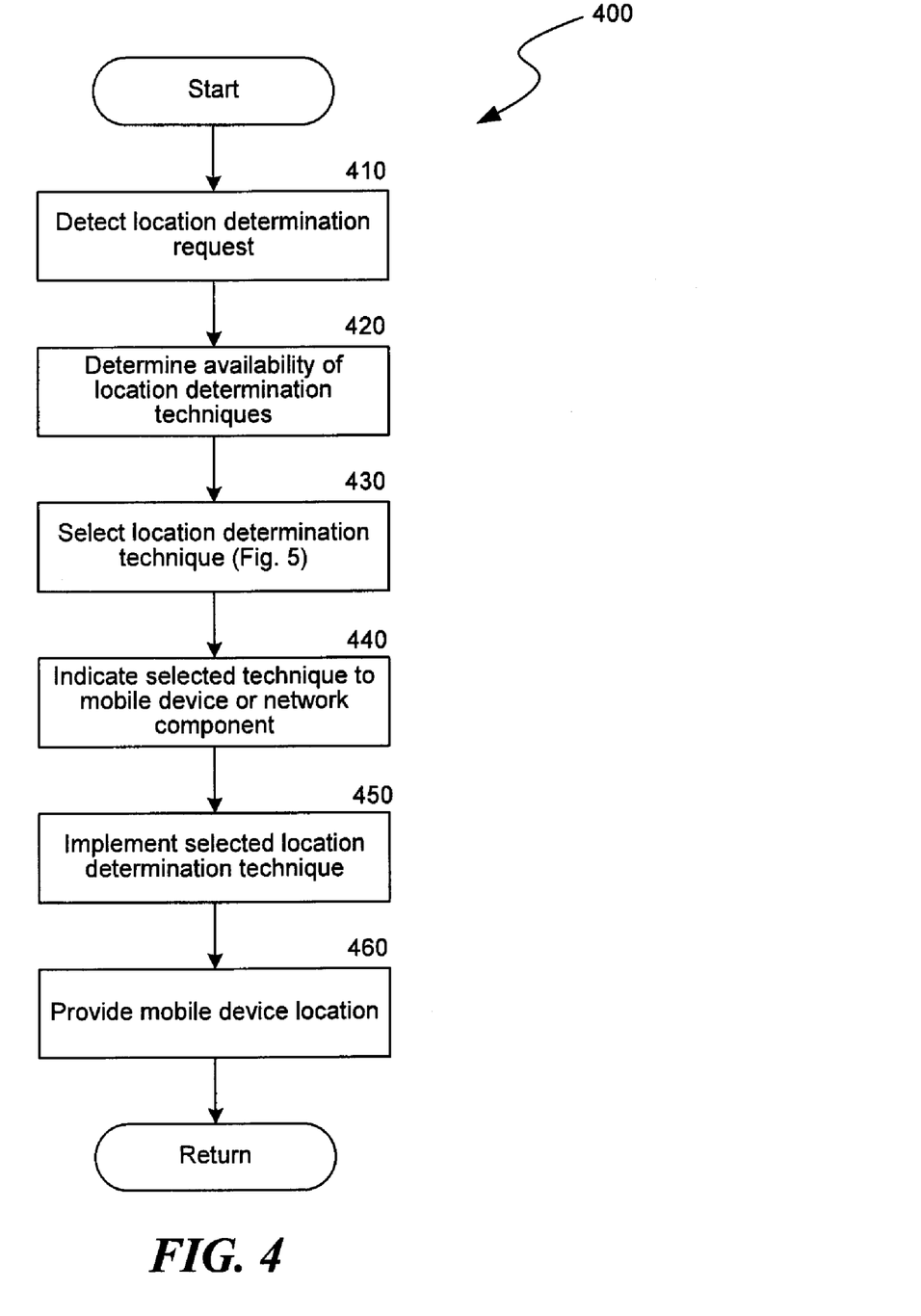
FIG. 4 is a logical flow diagram of a process for determining the location of a mobile device.
Figure 5:
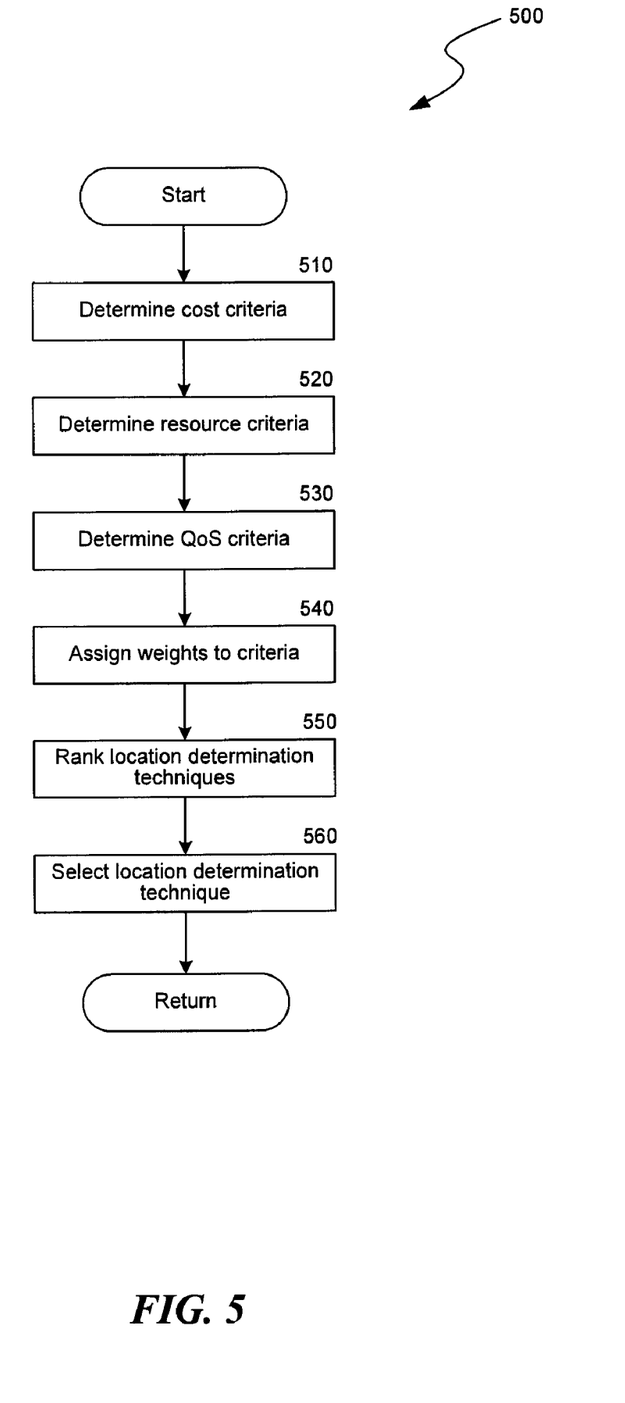
FIG. 5 is a logical flow diagram of a process for selecting a location determination technique to determine the location of a mobile device.

FIG. 4 is a logical flow diagram of a process 400 implemented by facility 300 for locating a mobile device. FIG. 5 is a logical flow diagram of a process 500 implemented by facility 300 for selecting a location determination technique to determine the location of a mobile device. Instructions causing processes 400 and 500 to be executed may be stored in nonvolatile memory.

Flowing from a starting block, processing begins at step 410 where facility 300 detects a location determination request. The location determination request may be received from a user (when the facility is implemented on a mobile device), from a mobile device or network component (when the facility is implemented in a network component), and/or the like.

Upon detecting a location determination request, processing continues at step 420 where facility 300 determines the availability of potential location determination techniques. As discussed above, facility 300 may make this determination based on whether the mobile device and at least one network accessible to the mobile device are capable of employing or facilitating the potential location determination technique.

From step 420, processing flows to step 430 where facility 300 selects a location determination technique. Facility 300 may make this selection according to criteria such as the cost of employing the technique, QoS criteria, the capabilities and/or resources of given mobile devices and/or networks, and/or the like. FIG. 5 is a flow chart of a representative process 500 for selecting a location determination technique. At a step 510, the facility determines the appropriate cost criteria, at a step 520 the facility determines the appropriate resource criteria, and at a step 530 the facility determines the appropriate QoS criteria with which to assess the available location determination techniques. The appropriate cost, resource, and QoS criteria may include any or all of the criteria discussed above in conjunction with FIG. 3.

From step 530, processing flows to step 540 where facility 300 assigns weights to the cost, resource, and QoS criteria. Facility 300 may assign weights to the criteria in any of the manners described above. However, in one process, the facility assigns weights to each of the criteria according to the relative importance of each criterion to a requesting location-based service. For example, weights for a time-sensitive location-based service may place greater emphasis on response time and less emphasis on accuracy and/or cost while weights for a cost-sensitive application may place great emphasis on cost, minimal emphasis on accuracy, and no emphasis on response time.

Following assignment of weights to the criteria, processing continues at step 550 where facility 300 ranks the location determination techniques, e.g., according to an analysis performed by the facility using the weights and characteristics associated with each location determination technique. For example, facility 300 may rank the location determination techniques by multiplying the weights for each weighted criterion with scores indicating characteristics of the location determination technique relevant to that criterion (e.g., a score corresponding to a response time criterion may indicate how fast the location determination technique is, a score corresponding to an accuracy criterion may indicate how accurate the location determination technique is, etc.). The resulting products can then summed for each location determination technique and the location determination techniques ranked according to the sums.

From step 550, processing flows to step 560 where facility 300 selects a location determination technique by selecting the highest ranked technique. Facility 300 may also select multiple location determination techniques, e.g., to function together as a hybrid location determination technique or may determine a network and/or communications mode associated with the selected location determination technique.

Returning to FIG. 4, following the selection of the location determination technique, processing continues to step 440 where facility 300 indicates the selected location determination technique to a mobile device or network component for implementation. Processing then continues to step 450 where the selected location determination technique is implemented to determine or estimate the location of the mobile device. Following the determination or estimation of location, processing continues at step 460 where the determined or estimated mobile device location is provided to the mobile device, a user of the mobile device, a location-based service, a remote party, and/or the like. As one example, steps 450 and 460 are performed by a mobile device or network component that is separate from facility 300. However, in certain implementations, steps 450 and 460 may be performed by facility 300. From step 460, processing ends or returns to other actions.

ILLUSTRATIVE EXAMPLES

To more clearly illustrate the weighting, ranking, and selecting of a location determination technique of process 500, two examples are provided below. However, these examples are provided merely to illustrate some of the many possible criteria, scores, and/or weights that may be employed for these and other location determination technique selections.

Tables 1 and 2, below, illustrate an example weighing and scoring of a location determination technique for an emergency situation in which an IPDL-OTDOA location determination technique is compared to a CGI-based location determination technique. In the illustrated situation, QoS is weighted more heavily than either cost or resources.

TABLE 1

Emergency Situation Weights, IPDL-OTDOA Scores

| Criterion | Weight | Unweighted Score | Weighted* Score |
|---|---|---|---|
| Cost ($0.50) | 0.05 | 20 | 1 |
| Resources | 0.10 | 50 | 5 |
| QoS | 0.85 | 80 | 68 |
| | | Sum | 74 |

TABLE 2

Emergency Situation Weights, CGI Scores

| Criterion | Weight | Unweighted Score | Weighted* Score |
|---|---|---|---|
| Cost ($0.01) | 0.05 | 100 | 5 |
| Resources | 0.10 | 100 | 10 |
| QoS | 0.85 | 15 | 12.75 |
| | | Sum | 27.75 |

As shown in Tables 1 and 2, the IPDL-OTDOA location determination would be selected over the CGI-based location determination technique based on the higher sum for the IPDL-OTDOA location determination technique. The higher sum indicates that the IPDL-OTDOA location determination technique provides the best criterion balance for an emergency situation where QoS is the most important criterion.

In contrast to the emergency situation, for a location-based advertising application, different weights would typically be applied. Tables 3 and 4, below, illustrate an example of weighing and scoring between an OTDOA location determination technique and a CGI-based location determination technique for a location-based advertising application. In location-based advertising applications, the cost and resources consumed by the location determination technique will take precedence over the QoS of the location determination technique.

TABLE 3

Location-Based Advertising Weights, OTDOA Scores

| Criterion | Weight | Score | Weight* Score |
|---|---|---|---|
| Cost ($0.25) | 0.40 | 40 | 16 |
| Resources | 0.40 | 35 | 14 |
| QoS | 0.20 | 75 | 15 |
| | | Sum | 45 |

TABLE 4

Location-Based Advertising Weights, CGI Scores

| Criterion | Weight | Score | Weight*<br>Score |
|---|---|---|---|
| Cost ($0.01) | 0.40 | 100 | 40 |
| Resources | 0.40 | 100 | 40 |
| QoS | 0.20 | 15 | 3 |
| | | Sum | 83 |

As shown in Tables 3 and 4, for the location-based advertising application, the CGI-based location determination technique would be selected over the OTDOA location determination technique based on the higher sum for the CGI-based location determination technique. The higher sum indicates that the OTDOA location determination technique provides the best criterion balance for an advertising application where cost and resources are the most important criterion.

Conclusion

Unless the context clearly requires otherwise, throughout the description and the claims, the words "comprise," "having," "include," and the like, and conjugates thereof, are to be construed in an inclusive sense, as opposed to an exclusive or exhaustive sense; that is to say, in the sense of "including, but not limited to." As used herein, the term "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description that are singular or plural may also be deemed to include plural or singular forms, respectively. The word "or," in reference to a list of two or more items, covers all of the following interpretations of the word: any of the items in the list, all of the items in the list, and any combination of the items in the list. The terms "based on," "according to," and the like are not exclusive and are equivalent to the term "based, at least in part, on," "at least according to," or the like and include being based on, or in accordance with, additional factors, whether or not the additional factors are described herein.

The above Detailed Description of embodiments of the system is not intended to be exhaustive or to limit the system to the precise form disclosed above. While specific embodiments of, and examples for, the system are described above for illustrative purposes, various equivalent modifications are possible within the scope of the system, as those skilled in the relevant art will recognize. For example, while processes or steps are presented in a given order, alternative embodiments may perform routines having steps, or employ systems having steps, in a different order, and some processes or steps may be deleted, moved, added, subdivided, combined, and/or modified to provide alternative or subcombinations. Each of these processes or steps may be implemented in a variety of different ways. Also, while processes or steps are at times shown as being performed in series, these processes or steps may instead be performed in parallel, or may be performed at different times.

Any patents and applications and other references noted above, including any that may be listed in accompanying filing papers, are incorporated herein by reference. While certain aspects of the invention are presented below in certain claim forms, the applicant contemplates the various aspects of the invention in any number of claim forms. For example, while only one aspect of the invention is recited as a means-plus-function claim under 35 U.S.C. §112, ¶6, other aspects may likewise be embodied as a means-plus-function claim, or in other forms, such as being embodied in a processor-readable medium. (Any claims intended to be treated under 35 U.S.C. §112, ¶6 will begin with the words "means for." Use of the term "for" in any other context is not intended to invoke treatment under 35 U.S.C. §112, ¶6.) Accordingly, the applicant reserves the right to add additional claims after filing the application to pursue such additional claim forms for other aspects of the invention.

I claim:

1. A method for selecting a location determination technique for determining a location of a mobile device, comprising:
    detecting a request to determine the location of the mobile device;
    determining a cost criterion, a resource criterion, and a quality of service (QoS) criterion that are associated with the detected request to determine the location of the mobile device;
    determining two or more location determination techniques that are currently employable to determine the location of the mobile device;
    assigning a weight to the cost criterion, a weight to the resource criterion, and a weight to the QoS criterion,
    ranking the determined two or more location determination techniques according to the cost criterion, the resource criterion, and the QoS criterion,
        wherein the ranking is performed utilizing the weighted cost criterion, the weighted resource criterion, and the weighted QoS criterion; and
    selecting a location determination technique from the determined two or more location determination techniques according to the ranking.

2. The method of claim 1, further comprising:
    implementing the selected location determination technique to determine the location of the mobile device; and
    providing the determined location of the mobile device to an originator of the request for the location.

3. The method of claim 1, further comprising:
    disassociating the mobile device from a first network with which the mobile device was associated; and
    associating the mobile device to a second network through which the selected location determination technique may be executed.

4. The method of claim 1, wherein the QoS criterion associated with the selected location determination technique is based on at least one of a horizontal accuracy, a vertical accuracy, a horizontal precision, a vertical precision, or a response time.

5. The method of claim 1, wherein at least one of the multiple location determination techniques includes techniques based on a Time Difference on Arrival (TDOA) technique, a Global Positioning System (GPS), an Assisted Global Positioning System (AGPS), an Emergency Intersystem Handoff (EISHO) technique, a Round Trip Time (RTT) measurement, an Enhanced Observed Time Difference (E-OTD) technique, or triangulation.

6. The method of claim 1, wherein at least one of the multiple location determination techniques is employable to determine the location of the mobile device according to an identifier of at least one of a cell, femtocell, picocell, access point, or cell site; wherein the at least one of the cell, femtocell, picocell, access point, or cell site is within communications range of the mobile device; and wherein the identifier includes at least one of an Internet Protocol (IP) address, a Cell Global Identity (CGI), an Enhanced Cell Global Identity (E-CGI), a Media Access Control (MAC) address, a Service Set Identifier (SSID), an International Mobile Subscriber Identity (IMSI), an International Mobile Equipment Identity (IMEI), or a serial number.

7. The method of claim 1, wherein the method is performed on one of a mobile device, base station, Node-B, Base Station Controller, Radio Network Controller, eNode-B, access point, Unlicensed Network Controller, Serving Mobile Location Center (SMLC), Standalone Assisted Global Positioning System SMLC, Mobility Management Entity, IP Multimedia Subsystem, Secure User Plane Location system, switch, or Gateway Mobile Location Center.

8. A method of selecting a location determination technique for purposes of estimating a location of a mobile device, comprising:
   determining an availability of a plurality of location determination techniques that may be used to estimate the location of a mobile device;
   assigning a weight to a quality of service (QoS) criterion associated with a selected location determination technique;
   assigning a weight to a cost criterion associated with employing the selected location determination technique, to a resource criterion associated with the selected location determination technique, or to both a cost criterion associated with employing the selected location determination technique and to a resource criterion associated with the selected location determination technique;
   ranking the plurality of location determination techniques according to (a) the weighted QoS criterion, and (b) the weighted cost criterion, the weighted resource criterion, or both the weighted cost criterion and the weighted resource criterion; and
   selecting an available location determination technique from the plurality of location determination techniques based at least in part on the ranking.

9. The method of claim 8, further comprising:
   implementing the selected location determination technique to determine the location of the mobile device.

10. The method of claim 8, further comprising:
   associating the mobile device to a network according to the selected location determination technique; and
   employing the associated network and the selected location determination technique to estimate the location of the mobile device.

11. The method of claim 8, wherein a given location determination technique is determined to be available if the mobile device and at least one network that is accessible to the mobile device are capable of employing or facilitating the given location determination technique.

12. The method of claim 8, wherein determining the availability of each of the multiple location determination techniques includes:
   determining, for each of the plurality of location determination techniques, whether the mobile device is capable of employing or facilitating the location determination technique;
   identifying networks currently accessible to the mobile device; and
   determining, for each of the plurality of location determination techniques, whether at least one of the identified networks is capable of employing or facilitating the location determination technique.

13. The method of claim 12, wherein the at least one of the identified networks is a Global System for Mobile Communications (GSM) network, a Time Division Multiple Access (TDMA) network, a Code Division Multiple Access (CDMA) network, an Orthogonal Frequency Division Multiple Access (OFDM) network, a General Packet Radio Service (GPRS) network, an Enhanced Data GSM Environment (EDGE) network, an Advanced Mobile Phone System (AMPS) network, a Worldwide Interoperability for Microwave Access (WiMAX) network, a Wireless Fidelity (WiFi) network, a Universal Mobile Telecommunications System (UMTS) network, an Evolution-Data Optimized (EVDO) network, a Long Term Evolution (LTE) network, an Ultra Mobile Broadband (UMB) network, a Generic Access Network (GAN) network, an Unlicensed Mobile Access (UMA) network, a VoIP network, a Secure User Plane Location (SUPL) enabled network, or an IP Multimedia Subsystem (IMS) enabled network.

14. The method of claim 8, wherein the resource criterion associated with employing the location determination technique relates to the use of a network resource or to the use of a mobile device resource.

15. The method of claim 8, wherein selecting the available location determination technique is based on a requesting location-based service or an expected frequency of estimating the location of the mobile device.

16. The method of claim 8, wherein the QoS criterion associated with the selected location determination technique is based on at least one of a horizontal accuracy, a vertical accuracy, a horizontal precision, a vertical precision, or a response time.

17. The method of claim 8, wherein at least one of the plurality of location determination techniques includes techniques based on a Time Difference on Arrival (TDOA) technique, a Global Positioning System (GPS), an Assisted Global Positioning System (A-GPS), an Emergency Intersystem Handoff (EISHO) technique, a Round Trip Time (RTT) measurement, an Enhanced Observed Time Difference (E-OTD) technique, or triangulation.

18. The method of claim 8, wherein at least one of the plurality of location determination techniques is employable to estimate the location of the mobile device according to an identifier of at least one of a cell, femtocell, picocell, access point, or cell site; wherein the at least one of the cell, femtocell, picocell, access point, or cell site is within communications range of the mobile device; and wherein the identifier includes at least one of an Internet Protocol (IP) address, a Cell Global Identity (CGI), an Enhanced Cell Global Identity (E-CGI), a Media Access Control (MAC) address, a Service Set Identifier (SSID), an International Mobile Subscriber Identity (IMSI), an International Mobile Equipment Identity (IMEI), or a serial number.

19. A tangible processor-readable storage medium storing processor-readable instructions, which, when executed, cause a processing component to execute a method of selecting a location determination technique, the method comprising:
   detecting a request to locate the mobile device;
   determining a quality of service (QoS) criterion associated with the detected request;
   determining at least one of a cost criterion associated with the detected request or a resource criterion associated with the detected request;

determining two or more location determination techniques that are currently employable to locate the mobile device;

assigning a weight to the QoS criterion;

assigning a weight to the cost criterion, to the resource criterion or to both the cost criterion and the resource criterion; and ranking the determined two or more location determination techniques according to the determined criterion, wherein ranking the determined two or more location determination techniques is performed utilizing (a) the weighted QoS criterion and (b) the weighted cost criterion, the weighted resource criterion or both the weighted cost criterion and the weighted resource criterion; and selecting a location determination technique from the determined two or more location determination techniques according to the ranking.

20. The tangible processor-readable storage medium of claim 19, wherein the method further comprises:

implementing the selected location determination technique to locate the mobile device; and providing the location of the mobile device to a Public Safety Answering Point (PSAP).

21. The tangible processor-readable storage medium of claim 19, wherein the QoS criterion is based on at least one of a horizontal accuracy, a vertical accuracy, a horizontal precision, a vertical precision, or a response time.

22. A system for selecting a location determination technique capable of locating a mobile device, comprising:

means for determining whether each of multiple location determination techniques is available to estimate the location of the mobile device;

means for assigning weights to a quality of service (QoS) criterion associated with a selected location determination technique, and to a cost criterion associated with employing the selected location determination technique, to a resource criterion associated with the selected location determination technique, or to both a cost criterion associated with employing the selected location determination technique and a resource criterion associated with the selected location determination technique;

means for ranking the multiple location determination techniques according to (a) the weighted QoS criterion and to (b) the weighted cost criterion, the weighted resource criterion or both the weighted cost criterion and the weighted resource criterion; and means for selecting the available location determination technique from the multiple location determination techniques based at least in part on the ranking.

23. The system of claim 22, further comprising:

means for implementing the selected location determination technique; and means for providing the location of the mobile device to the mobile device or to a requesting party.

24. The method of claim 22, wherein at least one of the multiple location determination techniques is employable to estimate the location of the mobile device according to an identifier of at least one of a cell, femtocell, picocell, access point, or cell site, wherein the at least one of the cell, femtocell, picocell, access point, or cell site is accessible to the mobile device, and wherein the identifier includes at least one of an Internet Protocol (IP) address, a Cell Global Identity (CGI), an Enhanced Cell Global Identity (E-CGI), a Media Access Control (MAC) address, a Service Set Identifier (SSID), an International Mobile Subscriber Identity (IMSI), an International Mobile Equipment Identity (IMEI), or a serial number.

25. A system for estimating a location of a mobile device located at a geographical location, comprising:

a first component configured to:
(a) determine an availability of each of multiple location determination techniques to estimate the location of the mobile device,
(b) assign weights to a quality of service (QoS) criterion associated with a selected location determination technique and a cost criterion associated with employing the selected location determination technique,
(c) rank the multiple location determination techniques according to the weighted QoS criterion and the weighted cost criterion, and
(d) select an available location determination technique from the multiple location determination techniques based at least in part on the ranking; and a second component configured to implement the selected location determination technique to estimate the location of the mobile device.

26. The system of claim 25, wherein the first component is further configured to (a) assign a weight to a resource criterion associated with the selected location determination technique, (b) rank the multiple location determination techniques according to the weighted QoS criterion, the weighted cost criterion, and the weighted resource criterion, and (c) select the available location determination technique according to the ranking.

27. The system of claim 25, wherein first component includes at least one of a Mobile Switching Center (MSC), a switch, a femtocell access point, a picocell access point, a base station, a cell site, a Base Station Controller (BSC), a network controller, a Node-B, an eNode-B, a Serving Mobile Location Center (SMLC), a Gateway Mobile Location Center (GMLC), or a Standalone Assisted Global Position System SMLC (SAS).

28. The system of claim 25, wherein the first and second components are within a Mobile Switching Center (MSC).

29. The system of claim 25, wherein the second component is the mobile device.

30. The system of claim 25, wherein the first component is configured to operate as a network component in at least one of a Global System for Mobile Communications (GSM) network, a Time Division Multiple Access (TDMA) network, a Code Division Multiple Access (CDMA) network, an Orthogonal Frequency Division Multiple Access (OFDM) network, a General Packet Radio Service (GPRS) network, an Enhanced Data GSM Environment (EDGE) network, an Advanced Mobile Phone System (AMPS) network, a Worldwide Interoperability for Microwave Access (WiMAX) network, a Wireless Fidelity (WiFi) network, a Universal Mobile Telecommunications System (UMTS) network, an Evolution-Data Optimized (EVDO) network, a Long Term Evolution (LTE) network, an Ultra Mobile Broadband (UMB) network, a Generic Access Network (GAN) network, an Unlicensed Mobile Access (UMA) network, a VoIP network, a Secure User Plane Location (SUPL) enabled network, or an IP Multimedia Subsystem (IMS) enabled network.

31. The system of claim 25, wherein at least one of the multiple location determination techniques includes techniques based on a Time Difference on Arrival (TDOA) technique, a Global Positioning System (GPS), an Assisted Global Positioning System (A-GPS), an Emergency Intersystem Handoff (EISHO) technique, a Round Trip Time (RTT) measurement, an Enhanced Observed Time Difference (E-OTD) technique, or triangulation; or wherein at least one of the multiple location determination techniques is employable to determine the location of the mobile device according to an identifier of at least one of a cell, femtocell, picocell, access point, or cell site; wherein the at least one of the cell, femtocell, picocell, access point, or cell site is accessible to the mobile device; and wherein the identifier includes at least one of an Internet Protocol (IP) address, a Cell Global Identity (CGI), an Enhanced Cell Global Identity (E-CGI), a Media Access Control (MAC) address, a Service Set Identifier (SSID), an International Mobile Subscriber Identity (IMSI), an International Mobile Equipment Identity (IMEI), or a serial number.

* * * * *